United States Patent [19]

McMullen

[11] Patent Number: 4,740,004
[45] Date of Patent: Apr. 26, 1988

[54] THREE WHEELED CYCLE WITH LOAD CARRYING BASKET

[76] Inventor: Wayne W. McMullen, 530 120th La. NW., Coon Rapids, Minn. 55433

[21] Appl. No.: 871,769

[22] Filed: Jun. 9, 1986

[51] Int. Cl.⁴ .............................................. B62K 5/08
[52] U.S. Cl. .............................. 280/269; 280/112 A; 280/282; 280/289 A
[58] Field of Search ............... 280/267, 266, 282, 111, 280/112 A, 268, 271, 272, 210, 235, 259, 261, 263, 281 LP

[56] References Cited

U.S. PATENT DOCUMENTS

| | | | |
|---|---|---|---|
| 580,587 | 4/1897 | Warman | 280/267 |
| 609,170 | 8/1898 | Smith | 280/232 |
| 3,561,778 | 2/1971 | La Brie | 280/282 |
| 3,583,727 | 6/1971 | Wallis | 280/112 A |
| 3,866,945 | 2/1975 | Bingham | 280/202 |
| 3,870,338 | 3/1975 | Holub | 280/209 |
| 3,902,738 | 9/1975 | Gandrud | 280/209 |
| 4,070,032 | 1/1978 | Cunningham | 280/282 |
| 4,088,199 | 5/1978 | Trautwein | 280/112 A |
| 4,132,435 | 1/1979 | Wilson | 280/267 |
| 4,277,078 | 7/1981 | Root | 280/281 R |
| 4,290,620 | 9/1981 | Chika | 280/209 |
| 4,351,410 | 9/1982 | Townsend | 280/112 A |
| 4,375,293 | 3/1983 | Solbes | 280/112 A |
| 4,469,344 | 9/1984 | Coil | 280/282 |

FOREIGN PATENT DOCUMENTS 2550507  2/1985  France .................. 280/282

Primary Examiner—John J. Love
Assistant Examiner—Everett G. Diederiks, Jr.
Attorney, Agent, or Firm—Burd, Bartz & Gutenkauf

[57] ABSTRACT

A tricycle having two front steering wheels and a rear drive wheel has a frame for accommodating the rear wheel and a mount pivotally connected to the front of the frame carrying a pair of front steering wheels. Handle bars are connected with a tie-rod assembly to the supporting forks for the front steering wheels. The mount has a parallel linkage which allows the frame and the front wheels to bank to facilitate the turning of the tricycle. A basket is suspended below the mount between the front wheels. A lock connected to the beams holds the beams in fixed relation relative to each other. The lock can be released to limit the angle of the bank of the tricycle.

21 Claims, 4 Drawing Sheets

THREE WHEELED CYCLE WITH LOAD CARRYING BASKET

FIELD OF INVENTION

The invention relates to a three wheeled person powered vehicle commonly called a tricycle. The tricycle is of the type having a pair of front steering wheels and a single rear drive wheel.

BACKGROUND OF INVENTION

The invention relates to a three wheeled person powered vehicle or tricycle for carrying substantial loads. Conventional three wheeled cycles or tricycles have a pair of rear wheels and a front steering wheel. Chain and sprocket drives are used to transmit torque to the rear wheels. These cycles have one or more handle bars to enable the operator to turn the front wheel. An example of this type of cycle is disclosed by Holub in U.S. Pat. No. 3,870,338. A basket or load carrying structure is located between the rear wheels.

The prior art three wheeled cycles are difficult to pedal and steer when burdened with a heavy load. The load basket being located behind the operator of the cycle can not be readily nor continuously observed during the operation of the cycle. When a basket is loaded, there is increased weight on the rear wheel. The load in the basket as well as the weight of the operator is not equally distributed between all of the wheels of the vehicle. These and other disadvantages of the prior three wheeled cycles are obviated by the cycle of the invention.

SUMMARY OF INVENTION

The invention is directed to a three wheeled land vehicle for conveniently and safely carrying relatively heavy loads. The vehicle is a person powered tricycle having a pair of front steering wheels and a rear drive wheel. Load carrying structure is located between the front wheels where it can be readily observed by the operator of the cycle. The load and operator carried by the cycle is balanced on all three wheels.

The tricycle has a central longitudinal frame provided with a rear fork for accommodating the rear drive wheel. Powered means mounted on the frame are operable to rotate the rear wheel to propel the tricycle over a supporting surface. A pair of front steering wheels are located on opposite sides of the front portion of the frame. A parallelogram mount connects the front wheels to the frame. The mount has a pair of transversely disposed beams pivotally connected to a support that is secured to the front of the frame. The outer ends of the beams are pivotally connected to sleeves that accommodate forks for rotatably supporting the front wheels. The forks are connected to a tie-rod assembly controlled with handle bars to concurrently turn the front wheels. The beams can move laterally relatively to each other to allow the wheels and frame to bank or tilt during the turning of the cycle. A lock associated with the beams is used to fix the position of the beams relative to each other. This prevents the frame and wheels from moving to a bank position. A load carrying basket is attached to the front of the frame between the front steering wheels. The center of gravity of the basket is relatively low and centrally located relative between the front wheels providing the cycle with stability and balance.

DESCRIPTION OF PREFERRED EMBODIMENT

Figure 1:
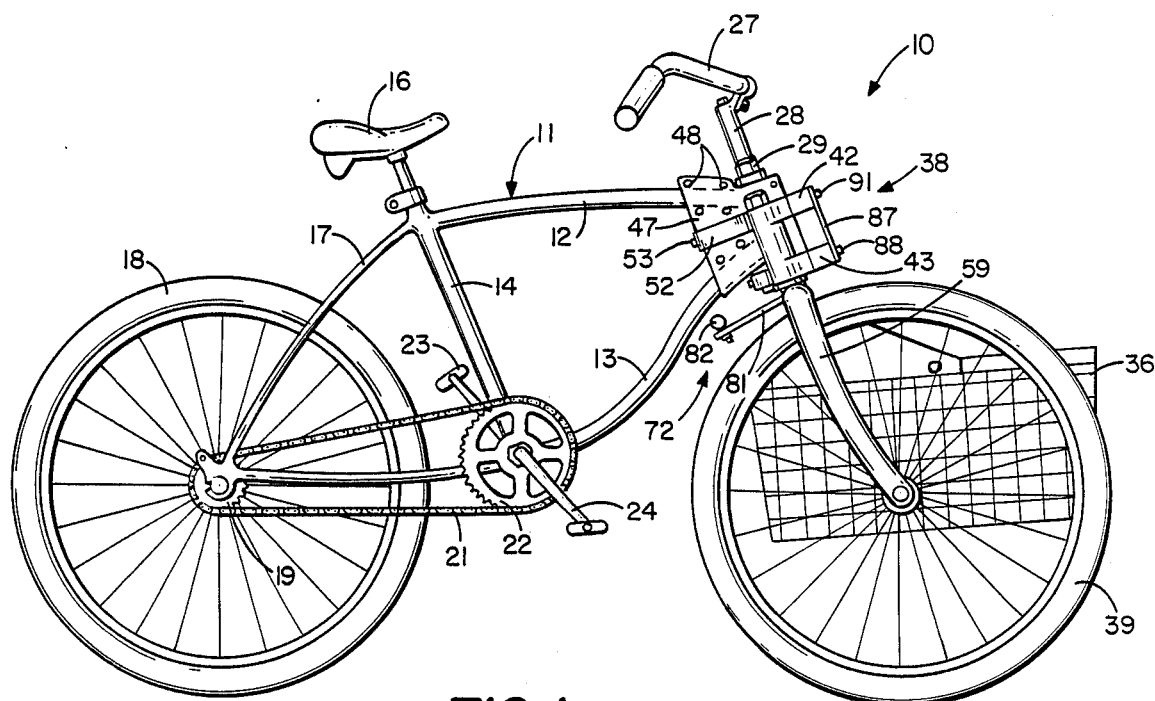
FIG. 1 is a side elevational view of the cycle of the invention.
Figure 2:
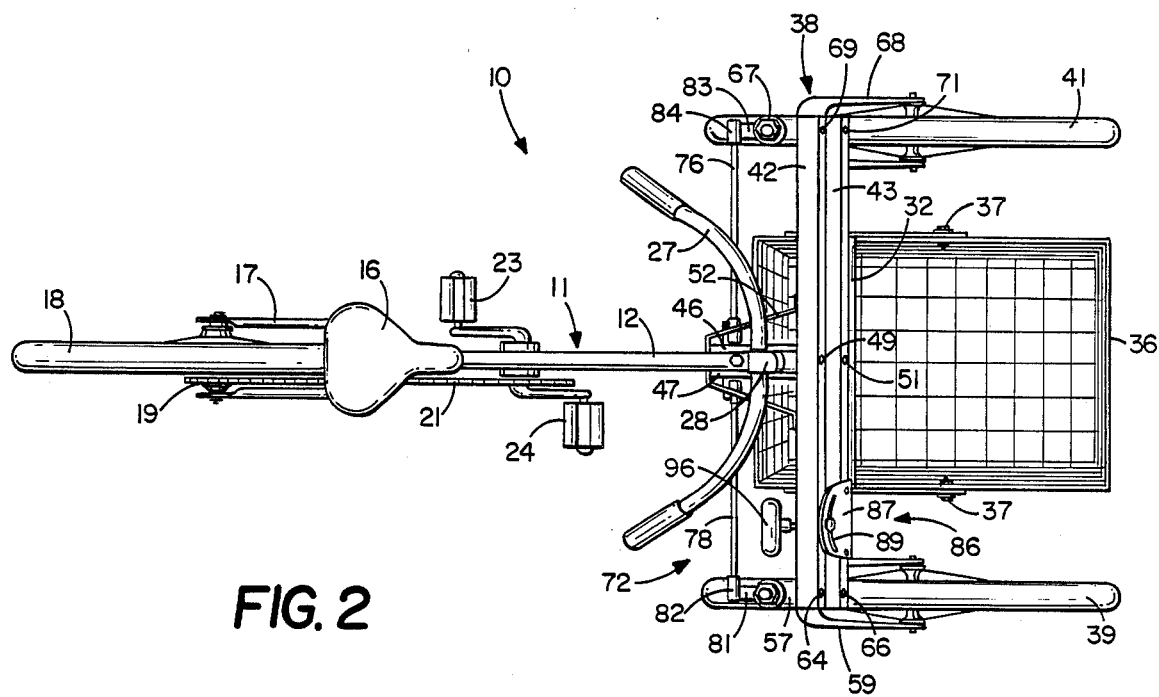
FIG. 2 is a top view thereof.
Figure 3:
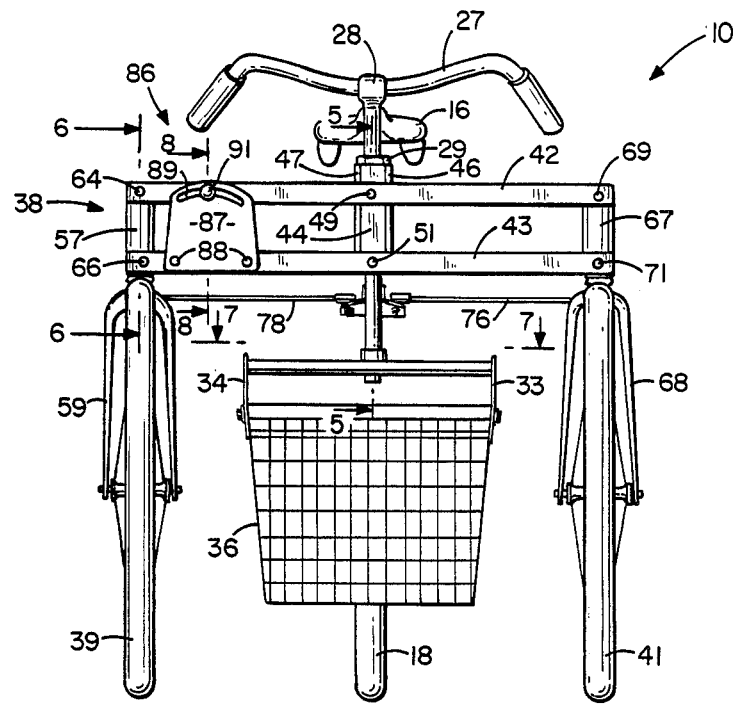
FIG. 3 is a front view thereof.

Referring to FIGS. 1 to 3, there is shown a cycle of the invention indicated generally at 10. Cycle 10 has a frame 11 including a top bar 12 and a bottom bar 13 joined to an upright post 14. A seat 16 is adjustably mounted on top of post 14. Frame 11 has a rearwardly directed fork 17 rotatably supporting a rear drive wheel 18. Wheel 18 has an axle assembly including a driven sprocket 19 accommodating a roller chain 21. The axle assembly can be the conventional ten speed drive for a bicycle. Chain 21 is located over a drive sprocket 22 rotatably mounted on sleeve bearings located in a cylinder on the bottom of post 14. Sprocket 22 is connected to foot pedals 23 and 24 operable by foot power to rotate drive sprocket 22 and thereby rotate rear wheel 18 to propel tricycle over the roadway, bike path, and the like. A suitable electric motor or internal combustion engine can be used to drive rear wheel 18.

Figure 5:
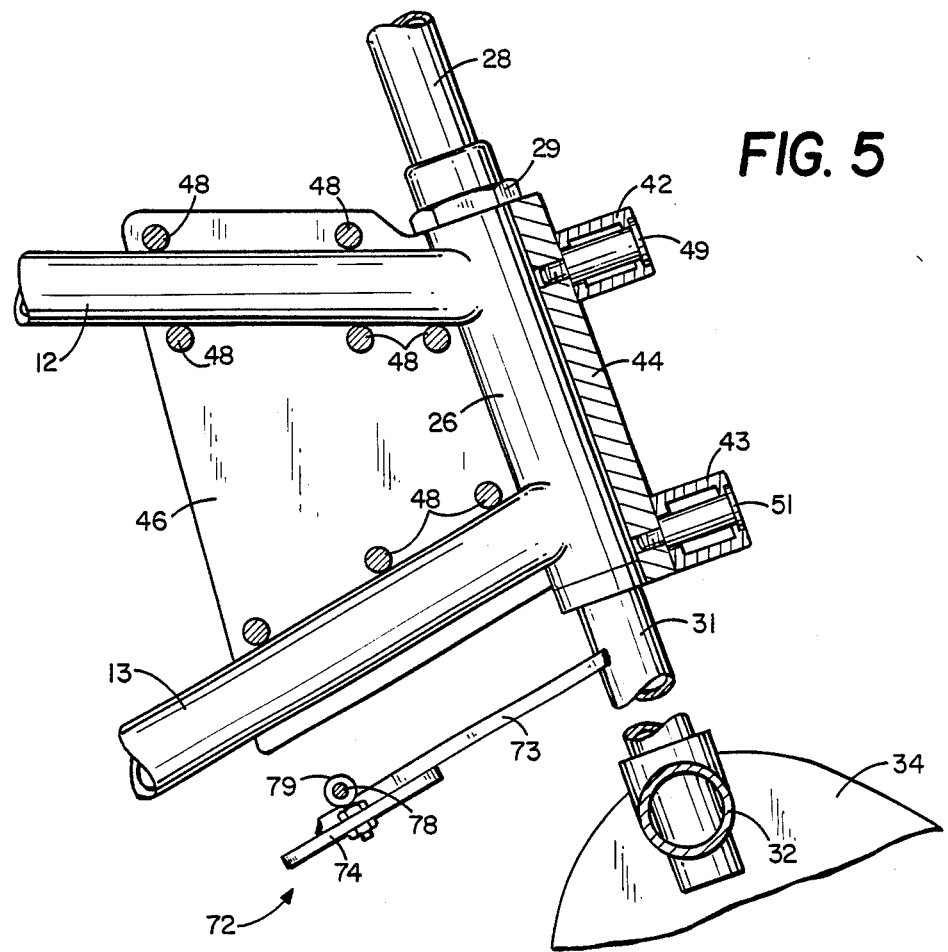
FIG. 5 is an enlarged sectional view taken along the line 5—5 of FIG. 3.

As shown in FIG. 5, bars 12 and 13 are joined to a generally upright sleeve 26. Sleeve 26 rotatably accommodates an upright spindle 31. A holder 28 for handle bar 27 is attached to the upper end of spindle 31 with a clamp nut 29. A cross member or tube 32 is attached to the bottom of spindle 31. A pair of generally triangular plates 33 and 34 are seucred to opposite ends of cross member 32. A wire basket 36 is attached to plates 33 and 34 with a plurality of nut and bolt assembly 37. Basket 36 has a flat bottom and upright side walls. The top of basket 36 is open to facilitate loading and unloading of objects and containers from the basket. The load in basket 36 has a low center of gravity which is generally below the spindle 31.

A parallelogram mount, indicated generally at 38, is located transversely of sleeve 26. Mount 38 locates a pair of front steering wheels 39 and 41 on opposite sides of central frame 11. Mount 38 has a pair of generally horizontal beams 42 and 43 pivotally mounted on a support member 44. Pivot bolts 49 and 41 connect center portions of beams 42 and 43 to member 44. Beams 42 and 43 are vertically spaced from each other and pivot about separate longitudinal axes. Beams 42 and 43 are transversely located relative to the longitudinal frame 11 and extend laterally from opposite sides thereof. Member 44 located in front of sleeve 26 is attached to frame 11 with a pair of plates 46 and 47. A plurality of bolts 48 clamp plates 46 and 47 to the front of frame 11, as shown in FIGS. 1, 3, and 5. Returning to FIG. 2, a generally U-shaped bracket 52 secured to top beam 42 extends around plates 46 and 47. A pivot bolt 53 axially aligned with pivot bolt 49 is secured to a block (not shown) located between and secured to plates 46 and 47.

Figure 6:
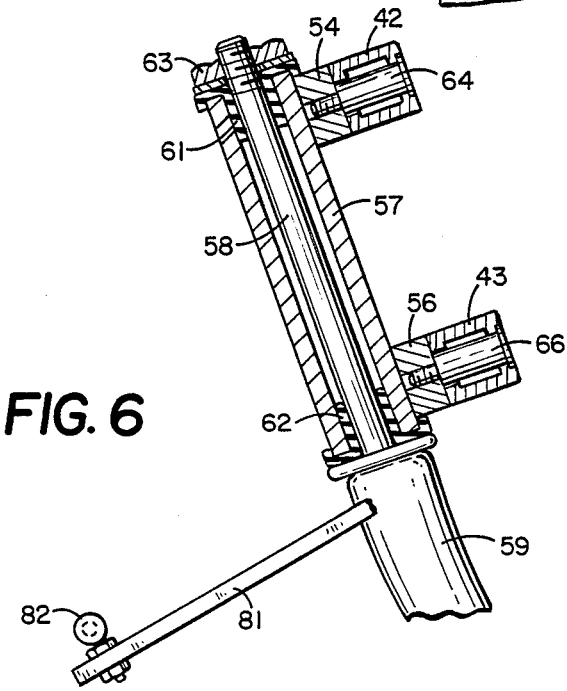
FIG. 6 is an enlarged sectional view taken along the line 6—6 of FIG. 3.

Referring to FIG. 6, a pair of blocks 54 and 56 are secured to an upright sleeve 57. A spindle 58 extended through sleeve 57 is rotatably mounted thereon with a pair of bearings 61 and 62. A fork 59 accommodating front wheel 39 is secured to the lower end of spindle 58. Wheel 39 has a conventional axle that is attached to the lower end of fork 59. A nut 63 threaded onto the top of spindle 58 holds spindle 58 in rotatable assembled relation with sleeve 57. A pair of pivot bolts 64 and 66 pivotally mount the ends of beams 42 and 43 to blocks 54 and 56 respectively.

Returning to FIGS. 2 and 3, wheel 41 is rotatably mounted in a fork 68 rotatably associated with an upright sleeve 67. Pivot bolts 69 and 71 join the outer ends of beam 42 and 43 to sleeve 67 in the same manner as shown in FIG. 6. The pivot bolts 49, 64, 69, and 51, 66, 71 have parallel pivot axes that locate beams 42 and 43 in parallel relation relative to each other. Beams 42 and 43 are parallel linkages that pivotally connect the central upright member 44 to sleeves 57 and 67 that accommodate forks 59 and 68 for front steering wheels 39 and 41 respectively.

Figure 7:
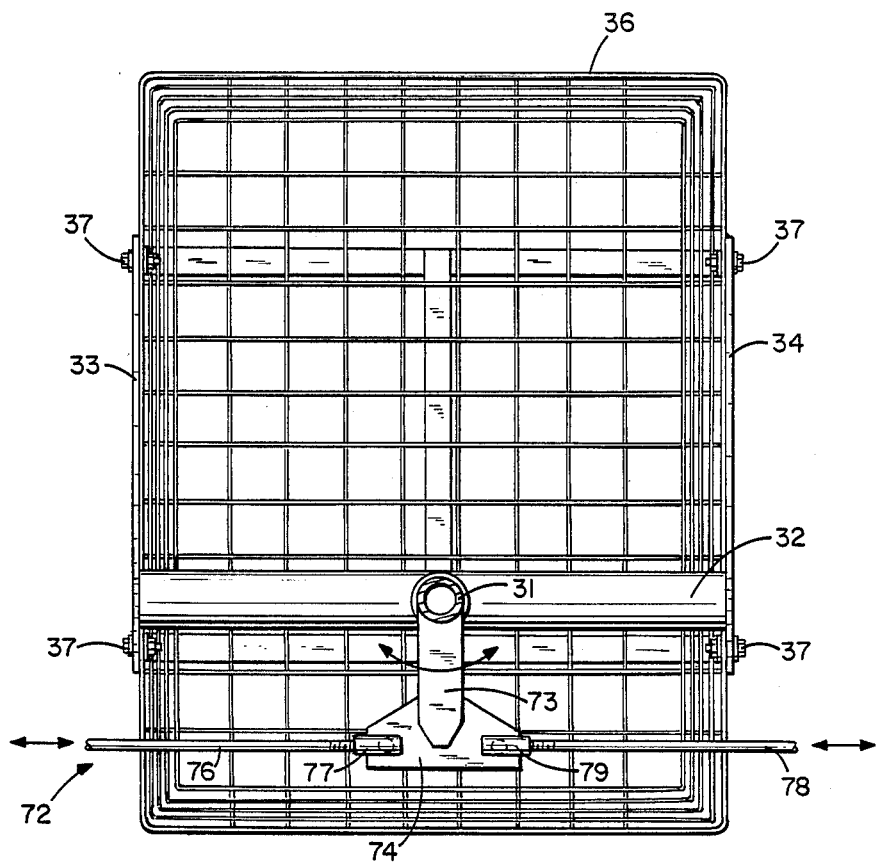
FIG. 7 is an enlarged sectional view taken along the line 7—7 of FIG. 3.

A tie-rod assembly, indicated generally at 72, connects the lower end of spindle 31 to forks 59 and 68 so that handle bar 27 can be used to simultaneously steer front wheels 39 and 41. As shwon in FIGS. 5 and 7, tie-rod assembly 72 has a central arm 73 secured at its outer end to a plate 74. A first tie-rod 76 threaded into a connector 77 is pivotally mounted to one end of plate 74. A second tie-rod 78 threaded into a connector 79 is pivotally connected to the opposite end of plate 74. As shown in FIG. 2, rod 76 is pivotally connected to an arm 83 joined to fork 68 with a ball and socket connector 84. The outer end of rod 78 is pivotally connected to an arm 81 joined to the lower end of the spindle 59 with a ball and socket connector 82. The toe-in of wheels 39 and 41 is adjusted by adjusting rods 76 and 78 relative to connector 82 and 84. The tie-rod assembly 72 enables the operator to simultaneously steer wheels 39 and 41 in response to turning of handle bar 27.

Figure 4:
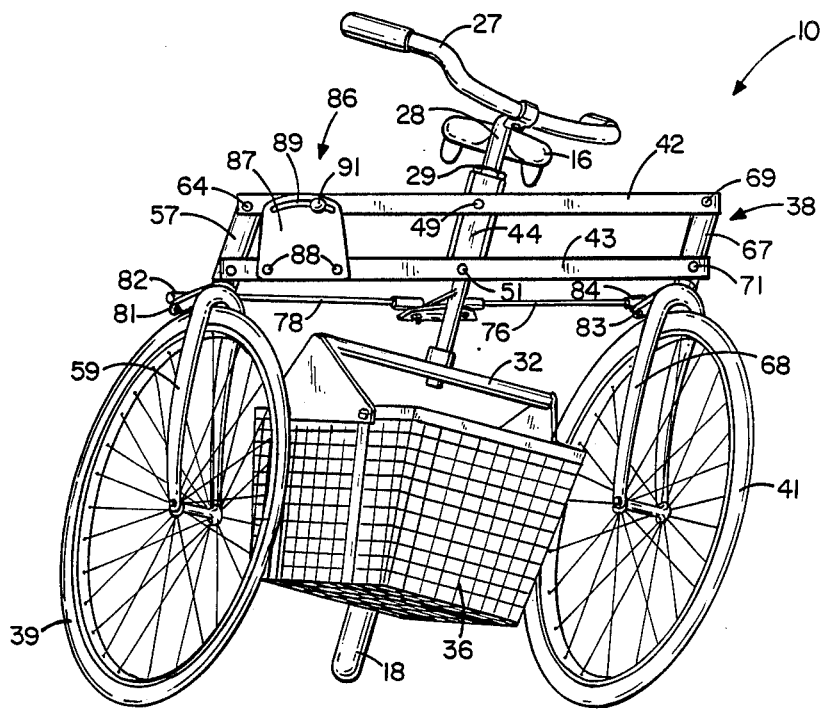
FIG. 4 is a front view similar to FIG. 3 showing the bicycle in a bank position.
Figure 8:
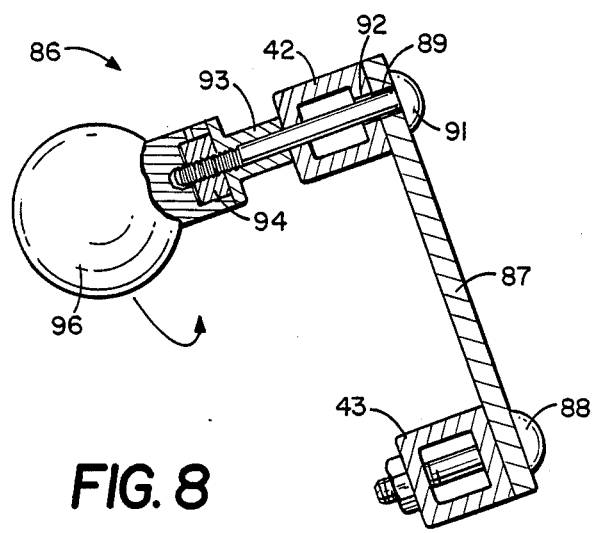
FIG. 8 is a large sectional view taken along the line 8—8 of FIG. 3.

Referring to FIGS. 3 and 8, a releasable lock, indicated generally at 86, is used to hold beams 42 and 43 in fixed relation relative to each other. Lock 86 can be released so that beams 42 and 43 move relative to each other and allow frame 11 and front wheels 39 and 41 to tilt or bank into a turn as shown in FIG. 4. Lock 86 has a plate 87 secured with a pair of bolts 89 to the bottom beam 43. The top of plate 87 has an upwardly curved arcuate slot 89. A bolt 91 extends through slot 89 and a hole 92 in beam 42. Bolt 91 further extends through a bearing sleeve 93 secured to back of beam 42 and accommodates a nut 94. A handle 96 mounted on nut 94 is used to rotate nut 94 thereby clamp plate 87 in fixed relation relative to top beam 42. When nut 94 is released, beam 42 can move relative to beam 43 by the amount determined by the length of slot 89. A lever can be used in lieu of handle 96 to hold bolt 91 and plate 87 in a fixed position.

In use, lock 86 can be tightened to hold front wheels 39 and 41 in upright parallel relation relative to rear wheel 18 as shown in FIG. 2. Handle 96 is turned tight to fix the positions of the beams 42 and 43 relative to each other. Handle bars 27 are used to simultaneously turn the front wheels 39 and 41 about their respective spindle axes. Tierods 76 and 78 are adjustable in their connectors 77 and 79 so that the parallelism between the front wheels 39 and 41 can be adjusted. The opertor uses the pedals 23 and 24 to apply torque to rear wheel 18 to propel cycle 10. Cycle 10 is equipped with front and rear wheels brakes (not shown) to facilitate operator control of the cycle. Basket 36 being located below the front of frame 11 and between front wheels 39 and 41 is continuously observable by the operator of the cycle. The load in the basket is located centrally between the front wheels and generally adjacent the axes of rotation of wheels 39 and 41. This balances and stabilizes the cycle thereby minimizing tipping and turning over of the cycle.

Lock 96 can be released whereby beams 42 and 43 can move in parallel relation relative to each other. Bicycle frame 11 as well as forks 59 and 68 can tilt or bank to either the right or the left by an amount determined by the length of the slot 89 in lock 86. As shown in FIG. 4, the tricycle 10 is in a left turn. Beams 42 and 43 have pivoted about their pivot bolts 49 and 64 and 68 and 51, 66 and 71. Tierod assembly 72 having ball and socket connections enables the operator of the cycle to turn front wheels 39 and 41 with the handle bars 27 and frame 11 in the bank position as shown in FIG. 4.

While there has been shown and described preferred embodiments of the cycle of the invention it is understood that changes in the structure and materials made by an arrangement of structure may be made by those skilled in the art without departing from the invention. The invention is defined in the following claims.

The embodiments of the invention in which an exclusive property or privilege is claimed are defined as follows:

1. A cycle comprising: a frame including a generally upright sleeve at the front end thereof, a rear wheel mounted on the frame, means mounted on the frame operable to rotate the rear wheel, a pair of front wheels, mount means attached to the frame locating the front wheels, mount means attached to the frame locating the front wheels generally adjacent opposite sides of the frame, said mount means including a support member secured to the frame, a pair of beams located transversely of the frame, means pivotally connecting the beam to the support member first means rotatably supporting one front wheel, means pivotally connecting the first means to said pair of beams, second means rotatably supporting the other front wheel, means pivotally connecting the second means to said pair of beams, releasable lock means for holding the beams in fixed positions relative to each other and holding the front wheels in general parallel relation to each other, said lock means on being releasable allowing the beams to move relative to each other whereby the frame and wheels of the cycle can bank, steering means movably mounted on the frame connected to the front wheels to concurrently steer said pair of front wheels, said steering means includes generally upright spindle means rotatably mounted within said sleeve for rotation about a generally upright axis, said spindle means having an upper portion, a central portion, and a lower portion, tie-rod means connected between the central portion of the spindle means and both the first and second means, handle bar means connected to the upper portion of the spindle means operable to rotate said spindle means to thereby concurrently turn said pair front wheel means, means for carrying a load located between said pair of front wheel means below said spindle means, and means mounting the means for carrying a load on the lower portion of the spindle means whereby the means for carrying a load turns with said pair of front wheels.

2. The cycle of claim 1 wherein: the frame has a front portion, said mount means including a pair of plates secured to the support member located adjacent opposite sides of the front portion of the frame, and means clamping said plates onto the front portion of the frame.

3. The cycle of claim 2 wherein: said beams have first ends and second ends, said first means being pivotally connected to the first ends of the beams, and said second means being pivotally connected to the second ends of said beams.

4. The cycle of claim 1 wherein: the first means rotatably supporting one front wheel includes a first fork rotatably connected to said one front wheel and said second means includes a second fork rotatably connected to the other front wheel.

5. The cycle of claim 4 wherein: the first means rotatably supporting one front wheel includes a first sleeve and a first spindle rotatably mounted on the first sleeve, said first spindle being connected to said first fork, said second means rotatably supporting the other front wheel includes a second sleeve and a second spindle rotatably mounted on said second sleeve, said second fork being connected to said second spindle.

6. The cycle of claim 1 wherein: said lock means includes a plate having an arcuate slot secured to one beam, and means mounted on the other beam extended through said slot operable to clamp said plate to said other beam.

7. The cycle of claim 1 wherein: said means for carrying a load includes: basket means having opposite sides located between said front wheel below said spindle means, said means mounting the means for carrying a load including a cross member connected to the opposite sides of the basket means and the lower end of the spindle means.

8. A cycle comprising: a frame, rear drive wheel means and front steering wheel means rollably supporting the cycle on a surface, means mounted on the frame operable to rotate the rear drive wheel means to propel the cycle on said surface, means rotatably mounting the rear drive wheel means on said frame, mount means connected to said frame supporting said front steering wheel means, said mount means including a plurality of transverse beams, means pivotally mounting said beams to said frame, said front steering wheel means comprising first front wheel means, first means rotatably mounting said first front wheel means for movement about a generally upright axis, pivot means pivotally connecting said first means to said beams, second front wheel means, second means rotatably mounting said second front wheel means for rotation about a generally upright axis, second pivot means pivotally connecting said second means to said beams, steering linkage means movably mounted on said frame and connected to said first and second front wheel means operable to concurrently rotate said first ans second front wheel means about their respective generally upright axis to steer said cycle, said steering linkage means including generally upright spindle means rotatably mounted on the frame, said spindle means having an upper portion, a central portion, and a lower portion, steering means connected to the upper portion of the spindle means, a tie-rod assembly connected between the central portion of the spindle means and both the first and second means whereby movement of the steering means moves the tie-rod assembly to concurrently turn the first and second front wheel means about their respective generally upright axis, means for carrying a load located between said first and second front wheel means below said spindle means and means mounting the means for carrying a load on the lower portion of the spindle means whereby the means or carrying a load turns with the first and second front wheel means.

9. The cycle of claim 8 wherein: the frame has a front portion, said mount means including a pair of plates located adjacent opposite sides of the front portion of the frame, and means clamping said plates onto the front portion of the frame.

10. The cycle of claim 9 wherein: said beams have first ends and second ends, said first means beig pivotally connected to the first ends of the beams, and said second means being pivotally connected to the second ends of said beams.

11. The cycle of claim 8 wherein: the first means rotatably mounting said first front wheel means includes a first fork rotatably connected to said first front wheel means and said second means includes a second fork rotatably connected to the second front wheel means.

12. The cycle of claim 11 wherein: the first means rotatably supporting one front wheel includes a first sleeve and a first spindle rotatably mounted on the first sleeve, said first spindle being connected to said first fork, said second means rotatably supporting the other front wheel includes a second sleeve and a second spindle rotatably mounted on said second sleeve, said second fork being connected to said second spindle.

13. The cycle of claim 8 wherein: said steering means includes handle bar means mounted on the spindle means, said handle bar means being angularly movable to concurrently turn said first and second front wheel means and means for carrying a load.

14. The cycle of claim 8 wherein: said means for carrying a load comprises a basket having an open top, said basket being secured to means for mounting the means for carrying a load on the lower poriton of the spindle means.

15. The cycle of claim 8 including: lock means operably associated with said beams to hold said beams in fixed positions relative to each other, said lock means being releasable to allow said beams to move relative to each other.

16. The cycle of claim 15 wherein: said lock means includes a plate secured to one beam, and releasable fastening means connecting the plate to the other of said beams.

17. The cycle of claim 16 wherein: said plate has an arcuate slot accommodating said fastening means, said slot allowing limited movement of the beams when the fastening means is released.

18. A cycle comprising: a frame, rear drive wheel means and a pair of front steering wheel means rollably supporting the cycle on a surface, means mounted on the frame operable to rotate the rear drive wheel means to propel the cycle on said surface, means rotatably mounting the rear drive wheel means on said frame, mount means connected to said frame supporting said pair of front steering wheel means, said front steering wheel means comprising first front wheel means, first means rotatably mounting said first front wheel means for movement about a generally upright axis on said mount means, second front wheel means, second means rotatably mounting said second front wheel means for rotation about a generally upright axis on said mount means, steering linkage means movably mounted on said frame and connected to said first and second means operable to concurrently rotate said first and second front wheel means about their respective generally upright axis to steer said cycle, said steering linkage means including generally upright spindle means rotatably mounted on the frame, said spindle means having an upper portion, a central portion, and a lower portion, steering means connected to the upper portion of the spindle means, tie-rod means connected between the central portion of the spindle means and both the first and second means whereby movement of the steering means moves the tie-rod means to concurrently turn the first and second front wheel means about their respective generally upright axis, means for carrying a load located between first and second front wheel means below the spindle means, and means mounting the means for carrying a load on the lower portion of the spindle means whereby the means for carrying a load turns with the first and second front wheel means.

19. The cycle of claim 18 wherein: said steering means includes handle bar means mounted on the upper portion of the spindle means, said handle bar means being angularly movable to concurrently turn said first and second front wheel means and means for carrying a load.

20. The cycle of claim 18 wherein: said means for carrying a load comprises a basket located between said front wheel means, said basket being secured to the means mounting the means for carrying a load on the lower portion of the spindle.

21. The cycle of claim 18 wherein: the first means rotatably supporting one front wheel means includes a first sleeve and a first spindle rotatably mounted on the first sleeve, said first spindle connected to the said fork, said second means rotatably supporting the other front wheel means includes a second sleeve and a second spindle rotatably mounted on said second sleeve, said second fork being connected to said spindle, said tie-rod assembly being connected to said first and second spindles.

* * * * *